United States Patent Office 3,540,219
Patented Nov. 17, 1970

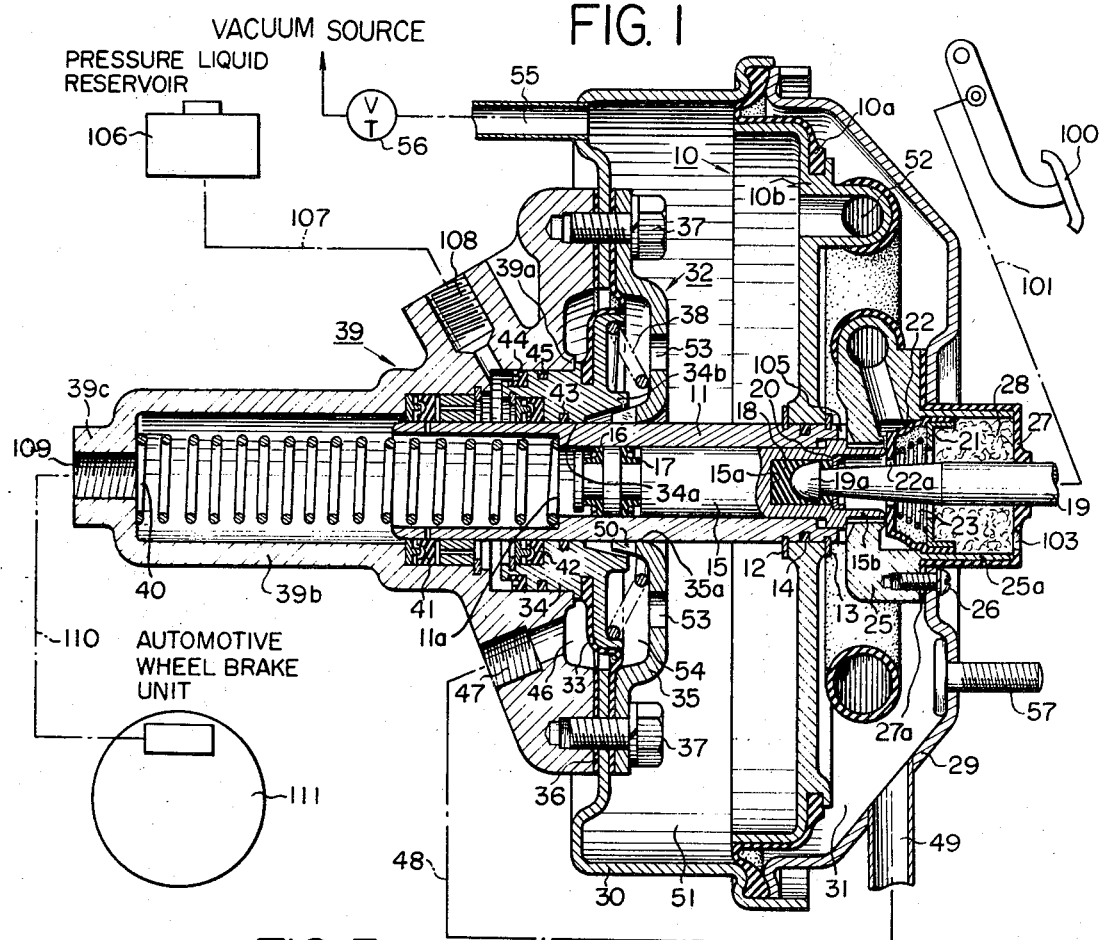
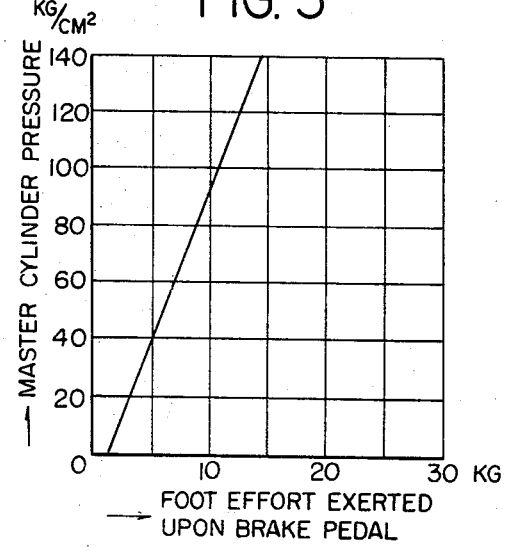
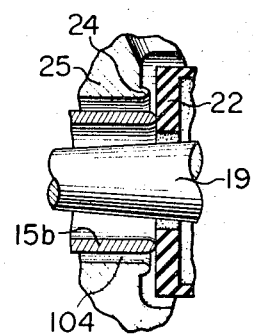

3,540,219
PNEUMATIC BOOSTER ASSEMBLY FOR BRAKE SYSTEM, ESPECIALLY ADAPTED FOR AUTOMOTIVE USE
Yooichi Huruta and Yoshiharu Adachi, Kariya-shi, Japan, assignors to Aisin Seiki Company Limited, Aichi-ken, Japan, a corporation of Japan
Filed May 28, 1968, Ser. No. 732,640
Claims priority, application Japan, May 30, 1967, 42/34,710
Int. Cl. F15b 7/00, 7/08
U.S. Cl. 60—54.5
10 Claims

ABSTRACT OF THE DISCLOSURE

The invention provides a pneumatic servo or booster assembly adapted for cooperation with a hydraulic automotive wheel brake system comprising a first hydraulic piston and a second hydraulic piston arranged to cooperate with a common hydraulic cylinder which is hydraulically connected with wheel brake cylinders, wherein locking means are provided within the master cylinder for the prevention of lost motion of the brake pedal, said lock means being effective only when the foot effort exceeds a predetermined servo-range of said assembly.

---

This invention relates to improvements in and relating to a pneumatic booster assembly for brake system, especially adapted for automotive use.

The above kind of booster or servo-assembly is designed so that a small manual operating effort exerted upon the foot pedal is boosted to a large hydraulic force to be exerted upon the automotive, brakes through the intermediary of the pneumatic servo or booster assembly. With this kind of pneumatic booster, the brake pedal is liable to perform a kind of lost movement when the exerted manual, or more correctly foot-operated effort upon the pedal exceeds a predetermined servo-function range. Even with continued and intensified effort applied upon the foot pedal beyond said functional range, the pressure in the master cylinder does not increase in the predetermined servo-ratio, but only slightly at a highly reduced rate.

It is therefore an object of the invention to provide an efficient and accurately operating pneumatic servo or booster assembly for use in a braking system, especially adapted for automotive use.

A further object of the invention is to provide a pneumatic booster assembly of the above kind which functions in such a way that even when the manual braking effort exceeds the designed servo-range upon the foot or brake pedal, the latter can be regularly manipulated without being subject to a dangerous lost motion and the master cylinder pressure can be increased at the predetermined regular rate as a function of the applied manual force.

Still another object of the invention is to provide an improved pneumatic booster assembly which is provided with a lock adapted for preventing the aforementioned lost motion of the brake pedal, if the manual pressure should be beyond the designed servo-range of the booster assembly.

These and further objects, features and advantages of the invention will become more apparent when reading the following detailed description of two preferred embodiments of the invention shown in the drawings. The embodiments are shown only for the purpose of illustration only and thus in no limiting sense of the invention.

In the accompanying drawings:

FIG. 1 is a schematic sectional representation of a first embodiment of the pneumatic booster assembly, shown together with several hydraulic brake components related therewith.

FIG. 1A is an enlarged partial view of the assembly shown in FIG. 1.

FIG. 3 is a diagram of the master cylinder pressure plotted against the manual braking force applied on the foot pedal, embodied in the improved booster assembly embodying the principles of the invention.

Figure 2:
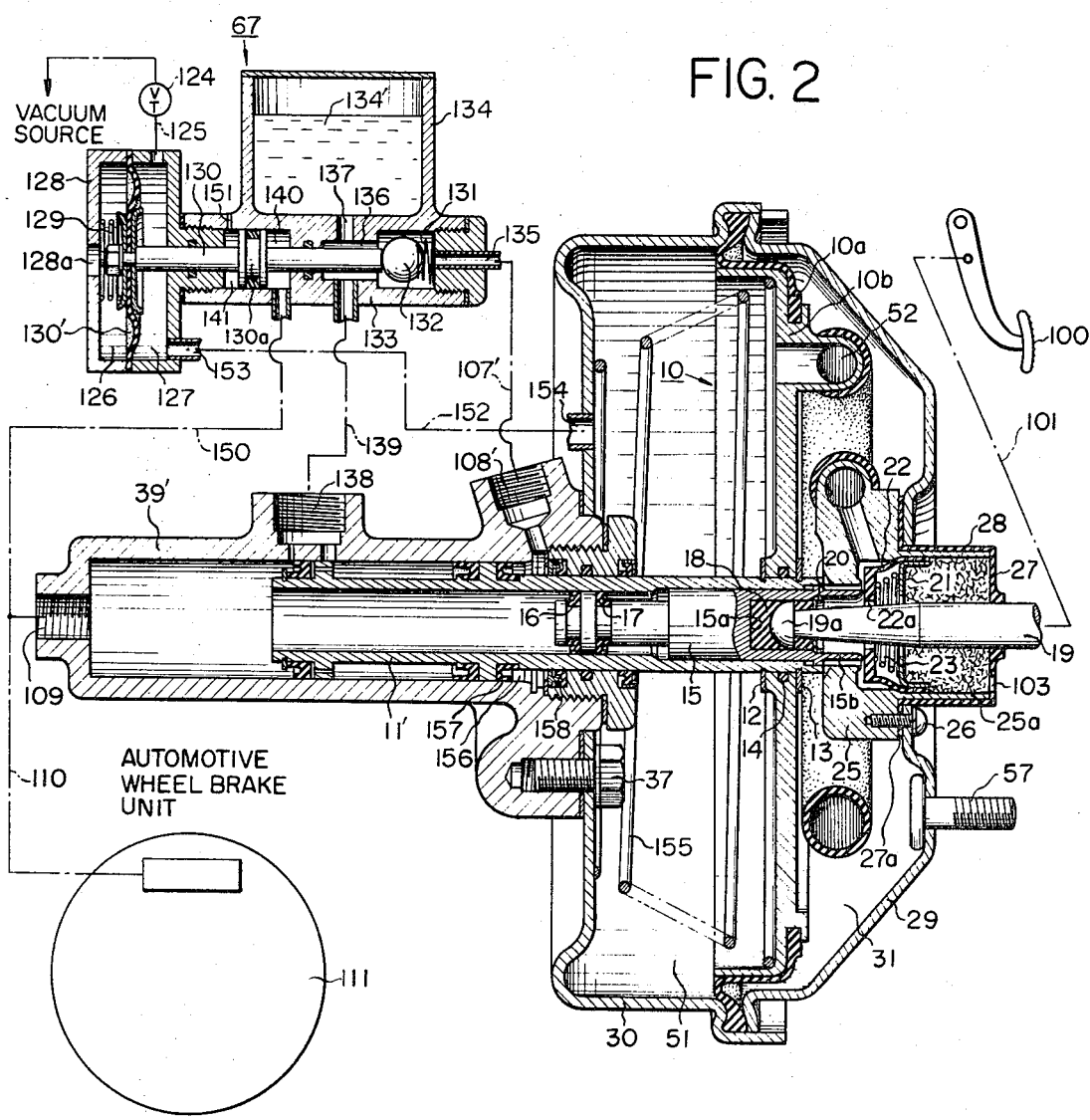
FIG. 2 is a similar view to FIG. 1, illustrative of a second embodiment of the invention.

Referring now to the accompanying drawings, especially FIGS. 1 and 1A thereof, the numeral 10 denotes a power diaphragm which may be of conventional design and mechanically coupled with a first hydraulic piston, made substantially into a hollow cylinder 11 as shown, by means of retaining members 12 and 13. Said diaphragm 10 comprises a flexible diaphragm proper 10a and a rigid circular shell 10b rigidly connected therewith. Sealing ring 14 is provided between said shell 10b and piston 11 for establishing an effective seal therebetween. Second hydraulic piston 15 is slidably mounted in the first piston 11 and provided with sealing rings 16 and 17 for establishing an effective sealing therebetween. At the extremity of the second piston 15, remote from said sealing rings 16 and 17, there is provided a recess 15a which receives therein a cushioning member 18 in which is embedded the enlarged end of pusher rod 19 mechanically connected with a conventional automotive foot pedal 100, only schematically shown. This mechanical connection is shown by a chain line 101 in a highly simplified way.

In order to prevent possible disengagement of the rod 19 from the recess 15a, the latter is closed by means of a plate closure 20 press-fit in position.

A centrally perforated dish 21 supports the skirt portion of a resilient valve member 22, cup-shaped and centrally perforated, said valve member being loaded by a spiral spring 23 bearing on the dish. The valve member is adapted for cooperating with a valve seat 24, see FIG. 1A, which is formed on a block 25 bolted at 26 to a casing cover 29 through the skirt 27a of a resilient sealing envelope 27 which encloses the cylindrical extension at 25a of said block 25 and sealingly engages the pusher rod, thereby allowing the latter to move to-and-fro relative to the shaft seal assembly including dish 21, cylindrical skirt 25a and resilient envelope 27, said assembly having a hollow inner space which is filled with a fibrous material 28 such as nylon fibers adapted for the prevention of undesirous invasion of foreign particles from the ambient atmosphere through the sealing part of the envelope 27 engaging the rod 19 into the interior of the booster assembly.

The valve member 22 is normally urged in the closing direction by the spring 23 and the skirt of the member 22 is held firmly in position by being squeezed between the dish 21 and cylindrical skirt 25a.

The casing cover 29 is mechanically coupled with a main housing 30 through the intermediary of the outer peripheral part of the diaphragm proper 10a, whereby the latter is positively kept in position. The interior space of the chamber 31 defined by the diaphragm assembly 10 and the casing cover 29 is called the working chamber, which is normally kept evacuated.

Another diaphragm assembly 32 comprises a resilient diaphragm 33, the inner periphery of which is fixedly attached to a third piston 34, while the outer periphery of said diaphragm 33 is fixed to the main housing 30. A dished and perforated diaphragm cover 35 having a central bore 35a through which the first piston 11 passes. Diaphragm cover 35, resilient diaphragm 33, main housing 30, sealing ring sheet 36 and third piston 34 are bolted firmly together at 37. Third piston 34 is formed with a central bore 34a through which the first piston 11 passes. A spiral spring 38 is kept under compression between third piston 34 and diaphragm cover 35. Thus, the third piston 34 is normally kept in pressure abutment against a ring projection 39a formed on a cylinder block 39 and acting as a stop which block has a cylinder proper 39b as an extension thereof. Between the end wall at 39c of the cylinder and a shoulder 11a formed on the inside wall surface of the first or hollow piston 11, a coiled spring 40 is provided for exerting a resilient axial pressure on the first piston in the right-hand direction in FIG. 1.

Sealing means 41 is provided between the inside cylinder wall of the block 39 and similar means 42 and 43 are also provided between the first piston and the third piston. Finally, similar means 44 and 45 are also provided between the largest part of the cylinder bore formed in the block 39. As seen, this bore is formed substantially into a tri-stepped configuration.

At the bored center of diaphragm cover 35, the latter is formed with a plurality of pawl-like, axially directed projections 50 only two of which are shown which are adapted for acting as stops for the third piston 34 when the latter is moved a certain distance in the right-hand direction in FIG. 1.

The second diaphragm 33 divides the interior space of the block 39 into two chambers, of which the left-hand one denoted 46 is fluidically connected through a first conduit 47 formed in the block, piping 48, shown only schematically by a chain line, and a second conduit 49 attached to the lower part of housing cover 29, to the working chamber 31.

The vacuum chamber 51, the right-hand extremity being defined by the first diaphragm assembly 10 and the left-hand extremity being defined by the diaphragm cover 35 as well as a part of the main housing 30, is fluidically connected through a piping 55, in which a vacuum control valve 56 is inserted, to a vacuum source.

Chamber 54 containing spiral spring 38 is kept in fluid communication through several perforations 53 cut through diaphragm cover 35 with vacuum chamber 51.

The operation of the booster assembly so far shown and described is as follows:

When the driver who is driving an automotive vehicle which is fitted with the booster, the fitting means being shown only partly at 57, exerts his foot pressure upon the foot pedal 100, motion is transmitted therefrom through mechanical link 101 to the pusher rod 19, whereby the latter and second piston 15 are moved in the left-hand direction in FIG. 1. In this way, the second piston 15 is advanced mechanically in the left-hand direction in FIG. 1 so that the right-hand extremity 15b of the piston is separated a slight distance from pressure and sealing contact with the resilient valve member 22. Thus, ambient atmosphere invades through an inlet opening 103, the filter material 28, interior space of said valve member, an annular space 22a formed between end wall of the valve member and the pusher rod, the now established small gap between the extremity of the second piston and the valve member, as well as the gap between the valve seat 24 and the valve member, and further through an annular space 104 formed between said piston extremity and the central bore wall of the block 25 and a lateral passage 105, into the working chamber 31, whereby a certain pressure increase above the designated vacuum is accumulated in the chamber. This will cause a pressure difference across the booster diaphragm or power piston 10 which is thereby caused to move in the left-hand direction, accompanying the first hydraulic piston 11. Therefore, the piston 11 advances relative to the second hydraulic piston 15 and when the pressure in the working chamber 31 reaches nearly the atmospheric pressure, the aforementioned movement of the first hydraulic piston in the leftward direction will stop.

If there are no other provisions made the first hydraulic piston would initiate its return when the brake pedal is further depressed in the working direction and the reduced volumetric amount should be replenished by a further increased action of the brake pedal 100. With this further advancing operation of the pedal, however, the pressure would not increase, and thus the operator could feel as if a breakage of brake piping system had occurred.

On the contrary, according to this invention, when the pressure difference between the chambers 31 and 51 and thus that between chambers 46 and 54 reaches a certain predetermined value, the third piston 34 will be moved in the righthand direction against the action of spring 38 and the ring projection at 34b of the piston 34 is brought into pressure abutment with the pawls 50 which are therefore urged to bend inwardly against the peripheral surface of the first hydraulic piston 11 which is thus locked in position. Under these circumstances, when the manual effort upon the brake pedal is increased for advancing the second hydraulic piston in the leftward direction, the first piston is positively prevented from further advancing movement, thanks to the mechanical lock at 50 under the action of the tapered ring projection 34b. Therefore, it will be clear from the foregoing that the hydraulic pressure in the master cylinder at 39b can be increased in this case in accordance with a designated servo-ratio.

This characteristic performance will be easily understood by reference to the diagram shown in FIG. 3.

The hydraulic brake piping schema employed in the aforementioned embodiment is conventional and thus it may be easily understood upon considering the following brief description.

In FIG. 1, numeral 106 denotes a pressure liquid reservoir from which pressurized oil is conveyed through a piping 107 and an inlet conduit 108 to the interior of master cylinder 39b which is thus filled with oil, as conventionally. From the cylinder 39b, pressure oil is delivered through an outlet opening 109 and piping 110 to the cylinder of a wheel brake 111. As commonly known, the brake units are plural in its number, but for simplicity, they are shown as if there be single. Next, referring to FIG. 2, the second embodiment of the present invention will be described hereinbelow.

In the present embodiment, several parts denoted 10, 10a, 10b, 12, 13, 14, 15, 15a, 15b, 16, 17, 18, 19, 19a, 20, 21, 22, 22a, 23, 24, 25, 25a, 27, 27a, 28, 29, 30, 31, 37, 51, 57, 100, 101, 103, 104, 109, 110 and 111 are similar in their design and function, and therefore a more detailed description thereof may be omitted without sacrificing better understanding of the invention.

In this second embodiment, there is provided a hydraulic pressure valve assembly 67. The first hydraulic piston 11' has a slightly modified configuration from that shown at 11 in the foregoing embodiment. Naturally, the power diaphragm assembly 10 is rigidly connected with the first hydraulic piston as before.

The hydraulic pressure valve assembly 67 comprises a reservoir 134 containing a certain quantity of a pressure liquid, preferably oil shown at 134'. Valve housing 133 is made integral with the reservoir 134 and receives therein slidably a valve piston 130, at the right-hand extremity of which there is provided a ball valve 132 resiliently urged by a spiral coil 131 to move towards its valve-closing position.

At the left-hand extremity of the valve piston, there is provided a diaphragm 130' which is urged by a spiral spring 129 to move in the right-hand direction.

The diaphragm 130 is encased within a casing 128, the interior of which is thus divided into two separated chambers 126 and 127.

The chamber 126 is kept in communication with the ambient atmosphere through an opening 128a formed through the outer casing wall of the chamber 126.

Another chamber 127 communicates through a piping 125 which is fitted therein a control valve 124 to a vacuum source, not shown.

The hydraulic master cylinder 39' is arranged to cooperate with a double piston assembly, as before, comprising first piston 11' and second piston 15. As before, the booster housing comprising casing cover 29 and main housing 30 houses in combination the power diaphragm assembly 10.

Inlet conduit 108' formed in the master cylinder 39' communicates through a piping 107', conduit 135, ball valve chamber 132' and passages 136 and 137 with the interior of the reservoir 134.

Second liquid inlet 138 communicates through piping 139, passages 136 and 137 with the interior of said reservoir 134. Valve piston carries a piston 130a which separates the left-hand bore space into two chambers 140 and 141.

The outlet opening 109 of the master cylinder 39' is fluidically connected through a piping 150 to the right-hand side piston chamber 140, while the left-hand side chamber 141 is kept in communication with ambient atmosphere through a lateral passage 151. The chamber 127 has an opening 153 which is fluidically connected through a piping 152 to an opening 154 which is cut through the wall of chamber 51.

Figure 2A:
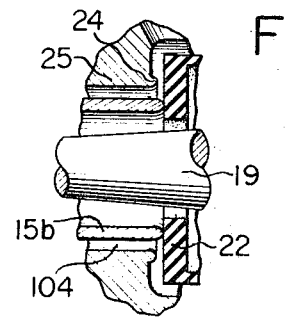
FIG. 2A is an enlarged partial view thereof.

A strong spiral spring is provided in the chamber 51, one end of said spring abutting against the housing wall of said chamber 51, while the opposite end of said spring 155 is kept in pressure engagement with the power diaphragm assembly 10, so as to urge it to move in the right-hand direction in FIG. 2. In FIG. 2A, a part of the pneumatic valve assembly is shown as before, so as to clearly demonstrate the valve seat gap relation.

The operation of the second embodiment so far shown and described is as follows.

When the driver actuates the brake pedal 100 with his foot pressure as before, the second hydraulic piston 15 will advance relative to the first hydraulic piston 11', as in the similar way described in the first embodiment, thereby pressurizing the hydraulic liquid contained in the master cylinder 39'. The thus elevated hydraulic pressure is delivered from outlet 109 through piping 150 to the right-hand side piston chamber 140, for urging the valve piston 130 in the left-hand position.

On the other hand, the left-and side diapragm chamber 126 is kept in communication with the ambient atmospheric pressure and the right-hand diaphragm chamber 127 is kept in communication with the vacuum source, as was already referred to.

Therefore, the diaphragm 130' is always subject to the pressure difference thereacross, assisted by the resilient urging force exerted by the spring 129, for moving in the right-hand direction in FIG. 2.

With an increase of the manual foot pressure exerted upon the brake pedal 100 and thus with a corresponding increase in the hydraulic pressure prevailing in the piston chamber 140 to a certain degree, the balanced condition will be lost and thus the valve piston 130 will move in the left-hand direction, thereby moving the ball valve 132 in the same direction under the spring action at 131. The hydraulic communication between the liquid reservoir 134 and the chamber at 156 is thereby interrupted and thus the constrained pressure oil in this chamber 156 will act thence as a hydraulic lock. For this purpose, the provision of expandable sealing means 157 and 158 serve in substantially assisting direction.

Therefore, even, when the driver exerts a further increased foot pressure upon the brake pedal, so as to increase the hydraulic pressure prevailing in the master cylinder 39a, the now established oil lock constituted by the constrained pressure oil within the locking chamber 156 will prevent effectively the otherwise possible feed-back operation of the first hydraulic piston to be caused to take place by the powerful hydraulic reaction acting in the right-hand direction in FIG. 2.

The operating characteristics of the improved second embodiment of the invention are similar to that shown in FIG. 3.

From the foregoing it will be clear that in the above-described pneumatic booster assembly in the form of the second embodiment comprising as before a first and a second hydraulic piston, the arrangement is such that when the manual braking effort being exerted upon the brake pedal reaches a certain predetermined valve a hydraulic chamber is brought into its perfectly closed position so as to establish an oil lock for blocking the first hydraulic piston, thereby preventing extraordinary lost motion of the foot-operated brake pedal. In this way, the brake pedal will become effective to operate accurately over an extended operating range.

It will be obvious to those skiled in the art that many modifications may be made within the scope of the present invention without departing from the spirit thereof, and the invention includes all such modifications.

What is claimed is:

1. A booster assembly for a vehicle brake system comprising; a fluid pressure cylinder containing a supply of fluid, a first hollow open-ended piston slidable in said fluid pressure cylinder, a second piston slidable in said hollow piston, manually operated push rod means operatively connected to said second piston, differential fluid pressure motor means having pressure responsive wall means connected to said hollow piston, valve means responsive to movement of said second piston into said fluid pressure cylinder by said push rod means to control movement of said wall means and said hollow piston from a first retracted position to a second extended position to pressurize the fluid in said fluid pressure cylinder, and locking means for locking said first piston in said second position against movement relative to said fluid pressure cylinder whereby further movement of said second piston by said push rod means in the same direction will cause a further increase in the pressure on said fluid in said fluid pressure cylinder.

2. A booster assembly as set forth in claim 1 wherein said locking means comprises a fluid chamber formed between said fluid pressure cylinder and said first piston, reservoir means, and a locking valve means formed in a fluid line connecting said chamber with said reservoir.

3. A booster valve assembly as set forth in claim 2 wherein said locking valve means comprises a plunger and a ball valve, air pressure difference means acting on one side of said locking valve means and means connecting said fluid pressure cylinder to the other side of said locking valve means so that said ball valve may be balanced to be opened or closed.

4. A booster assembly as set forth in claim 3 wherein said plunger is fixed in a movable wall positioned in said air pressure difference means and comprising spring means urging said ball valve in the open direction.

5. A booster assembly as set forth in claim 4 wherein said air pressure difference means is provided with a pair of chambers, one disposed in communication with ambient atmosphere and the other disposed in communication with said differential fluid pressure motor means.

6. A booster assembly as set forth in claim 1 wherein said locking means mechanicaly locks said first piston relative to said fluid pressure cylinder.

7. A booster aseembly as set forth in claim 6 wherein said locking means comprises a plurality of pawl members secured to said cylinder adjacent said first piston and air pressure difference means having a movable wall adapted to force said pawl members into locking engagement with said first piston upon movement of said wall.

8. A booster assembly as set forth in claim 7 wherein said air pressure difference means is located within said differential fluid pressure motor means.

9. A booster assembly as set forth in claim 8 further comprising spring means bearing against said movable wall to disengage said movable wall from said pawl members.

10. A booster assembly as set forth in claim 8 wherein said air pressure difference means is provided with a pair of chambers on opposite sides of said movable wall and further comprising means selectively communicating said chambers with opposite sides of the movable wall of said differential fluid pressure motor means.

References Cited

UNITED STATES PATENTS

| | | |
|---|---|---|
| 2,792,686 | 5/1957 | Ingres. |
| 2,876,627 | 3/1959 | Ayers. |
| 3,321,916 | 5/1967 | Cripe. |
| 3,387,455 | 6/1968 | Eggstein. |

MARTIN P. SCHWADRON, Primary Examiner

R. R. BUNEVICH, Assistant Examiner

U.S. Cl. X.R.

60—54.6